US008331695B1

(12) United States Patent
Delva (10) Patent No.: US 8,331,695 B1
(45) Date of Patent: Dec. 11, 2012

(54) INTEGRATED CIRCUIT HAVING A CIRCUIT FOR AND METHOD OF UPDATING PARAMETERS ASSOCIATED WITH A BACKGROUND ESTIMATION PORTION OF A VIDEO FRAME

(75) Inventor: Justin G. Delva, Burlington, MA (US)

(73) Assignee: Xilinx, Inc., San Jose, CA (US)

( * ) Notice: Subject to any disclaimer, the term of this patent is extended or adjusted under 35 U.S.C. 154(b) by 974 days.

(21) Appl. No.: 12/370,532

(22) Filed: Feb. 12, 2009

(51) Int. Cl.
G06K 9/68 (2006.01)
G06K 9/36 (2006.01)
G06K 9/46 (2006.01)

(52) U.S. Cl. ......... 382/218; 382/219; 382/236; 382/275

(58) Field of Classification Search .............. 382/218, 382/219, 220, 221, 162, 163, 236, 275
See application file for complete search history.

(56) References Cited

U.S. PATENT DOCUMENTS

| 2005/0213845 A1* | 9/2005 | Avinash et al. ............. 382/275 |
| 2007/0047834 A1 | 3/2007 | Connell |
| 2008/0310677 A1* | 12/2008 | Weismuller et al. ......... 382/103 |
| 2009/0002489 A1* | 1/2009 | Yang et al. .................. 348/143 |

OTHER PUBLICATIONS

Forbin G. et al., "Flicker compensation for Archived Film Using a Spatially-adaptive Nonlinear Model", Acoustics, Speech and Signal Processing, 2006, ICASSP 2006 Proceedings, 2006 IEEE International Conference on Toulouse, France, May 14-19, 2006, Piscataway, NJ, USA.

Hsueh-Yen Yang et al., "Algorithm and architecture design of adaptive brightness correction for video application", IEEE Transactions on Consumer Electronics, vol. 54, No. 4, Nov. 1, 2008, pp. 1858-1866, IEEE Service Center, NY, NY, USA.

U.S. Appl. No. 12/370,519, filed Feb. 12, 2009, Justin G. Delva.

P.J. Withagen, K. Schutte, and F.C.A. Groen, "Global intensity correction in dynamic scenes," IAS technical report IAS-UVA-07-01.

K. K. Wong, A. Das, and M. N. Chong, "Improved flicker removal through motion vectors compensation," in Proc. IEEE Third International Conference on Image and Graphics, Dec. 2004, pp. 552-555.

Y. Cai, K. Huang, T. Tan, and Y. Wang, "Context enhancement of nighttime surveillance by image fusion," in Proc. IEEE 18th International Conference on Pattern Recognition, 2006, pp. 980-983.

E. P. Bennett and L. McMillan, "Video enhancement using per-pixel virtual exposures," in Proc. of ACM SIGGRAPH, vol. 24, Jul. 2005, 8 pages.

R. Gonzalez and R. Woods, "Digital Image Processing," New Jersey: Prentice-Hall Inc., 2001, 4 pages.

(Continued)

Primary Examiner — John Strege
(74) Attorney, Agent, or Firm — John J. King (57) ABSTRACT

A method of updating parameters for pixels associated with a background estimation portion of a video frame is disclosed. The method comprises receiving a group of pixels of an incoming data stream associated with the video frame, each pixel of the group of pixels being characterized by a plurality of parameters; comparing, for each pixel of the group of pixels, the plurality of parameters for a pixel with the plurality of parameters for adjacent pixels; determining, for each pixel of the group of pixels, whether the parameters are similar to the parameters of an adjacent pixel; identifying a region of the group of pixels having similar parameters; and updating parameters for all pixels associated with the region with a single set of parameters.

15 Claims, 7 Drawing Sheets

OTHER PUBLICATIONS

A.J Lipton, H. Fujimori and R.S. Patil, "Moving target classification and tracking from real-time video," in Proc. IEEE Workshop Application of Computer Vision, pp. 8-14, 1998.

R.T. Collins, A.J. Lipton, T. Kanade, H . . . , "A System for Video Surveillance and Monitoring," in the Robotic Institute of Carnegie Mellon University and the Sarnoff Corporation report, 2000, 69 pages.

C. Stauffer and W. Grimson, "Adaptive background mixture models for real time tracking," in Computer Vision and Pattern Recognition, 1999, pp. 246-252.

Q. Zang and R. Klette, "Object Classification and Tracking in Video Surveillance," in CAIP proceedings of the 10'th International Conference, 2003, 8 pages.

P. Kaew, .T.K Pong and R. Bowden, "An improved adaptive background mixture model for real-time tracking with shadow detection." IEEE Proceedings of the $2^{nd}$ European Workshop on Advanced Video Based Surveillance Systems, Sep. 2001, 5 pages.

H. Jiang, V. Owall and H. Ardo, "Real-time Video Segmentation with VGA Resolution and Memory Bandwidth Reduction," Proceedings of the IEEE International Conference on Video and Signal Based Surveillance(AVSS'06) 2006, 6 pages.

J.C.S. Jacques, Jr., C. R. Jung, and S. R. Musse, "Background Subtraction and Shadow Detection in Grayscale Video Sequences", CROMOS Laboratory, PIPCA, Proceedings of the XVIII Brazilian Symposium on computer Graphics and Image Processing (SIBGRAPI'05), IEEE Computer Society, 2005 IEEE, 8 pages.

R. Gonzalez and R. Woods, "Digital Image Processing," New Jersey: Prentice-Hall Inc., 2001, Chapter 3 , Image Enhancement in the Spatial Domain, pp. 88-95.

\* cited by examiner

FIG. 11

INTEGRATED CIRCUIT HAVING A CIRCUIT FOR AND METHOD OF UPDATING PARAMETERS ASSOCIATED WITH A BACKGROUND ESTIMATION PORTION OF A VIDEO FRAME

FIELD OF THE INVENTION

The present invention relates generally to integrated circuits, and in particular, to a method of updating parameters associated with a background estimation portion of a video frame.

BACKGROUND OF THE INVENTION

The video surveillance market has seen an increase in demand over the last few years in response to a drop in pricing and improvement of camera technology. Improved capabilities of digital recording devices and new computing platforms capable of video analytics have also contributed to the increase in demand. Applications of video surveillance systems range from intrusion protection to monitoring and tracking of activities in both a known enclosed environment or an unknown dynamic environment, such as in aerial surveillance applications. Further, the need for better video resolution created an interest in using high definition (HD) rates for video surveillance.

Integrated circuits are an integral part of any electronic device including surveillance equipment. A variety of integrated circuits are often used together to enable the operation of the electronic device, such as a video surveillance network. While integrated circuits are typically designed for a particular application, certain integrated circuits may have configurable logic. For example, an application specific integrated circuit (ASIC) may have portions comprising configurable logic. Another type of integrated circuit which has configurable logic is a programmable logic device (PLD). A programmable logic device is designed to be user-programmable so that users may implement logic designs of their choices. One type of programmable logic device is a Complex Programmable Logic Device (CPLD). A CPLD includes two or more "function blocks" having a two-level AND/OR structure connected together and to input/output (I/O) resources by an interconnect switch matrix. Another type of programmable logic device is a field programmable gate array (FPGA). In a typical FPGA, an array of configurable logic blocks (CLBs) is coupled to programmable input/output blocks (IOBs). The CLBs and IOBs are interconnected by a hierarchy of programmable routing resources. For both of these types of programmable logic devices, the functionality of the device is controlled by configuration data bits of a configuration bitstream provided to the device for that purpose.

As with any electronic system, there is always a desire to increase the quality and reduce the cost of the system. While a system capturing video data may be used with any type of integrated circuit, image quality and the amount of data required to be processed pose significant problems in implementing the system to meet customer needs.

SUMMARY OF THE INVENTION

A method of updating parameters for pixels associated with a background estimation portion of a video frame is disclosed. The method comprises receiving a group of pixels of an incoming data stream associated with the video frame, each pixel of the group of pixels being characterized by a plurality of parameters; comparing, for each pixel of the group of pixels, the plurality of parameters for a pixel with the plurality of parameters for adjacent pixels; determining, for each pixel of the group of pixels, whether the parameters are similar to the parameters of an adjacent pixel; identifying a region of the group of pixels having similar parameters; and updating parameters for all pixels associated with the region with a single set of parameters. Receiving a group of pixels of an incoming data stream may comprise receiving a group of pixels characterized by an intensity, a weight and a variance. Receiving a group of pixels of an incoming data stream associated with the video frame may also comprise establishing a matrix associated with the group of pixels and providing each entry of the matrix with a plurality of values representative of a pixel of the group of pixels.

According to an alternate embodiment, a method of updating parameters for pixels associated with a background estimation portion of a video frame comprises characterizing pixels of an incoming data streams using a plurality of parameters; establishing a matrix for storing data for a group of pixels of the incoming data stream associated with the video frame, each pixel of the group of pixels being characterized by the plurality of parameters; establishing a plurality of sub-matrices of the matrix; comparing, for each pixel of a sub-matrixes, the plurality of parameters for a pixel of a sub-matrices with the plurality of parameters for another pixel of the sub-matrix; identifying sub-matrices of the matrix having similar parameters; and updating parameters for all pixels associated with each sub-matrices having similar parameters with a single set of parameters. Characterizing pixels of an incoming data streams using a plurality of parameters may comprise selecting a Gaussian value of a mixture of Gaussian values.

An integrated circuit having a circuit for updating parameters for pixels associated with a background estimation portion of a video frame is also disclosed. The integrated circuit comprises an input buffer for receiving pixels of a data stream comprising the video frame; a processing circuit coupled to the input buffer, the processing circuit generating a single set of parameters for pixels having similar parameters; and a parameter memory coupled to receive the single set of parameters from the processing circuit. The integrated circuit may further comprise a parameter buffer coupled to receive YUV data and convert it to RGB data, and a parameter buffer coupled to receive RGB data and convert it to YUV data. The integrated circuit may be any type of integrated circuit, including integrated circuits having programmable logic.

DETAILED DESCRIPTION OF THE DRAWINGS

Figure 1:
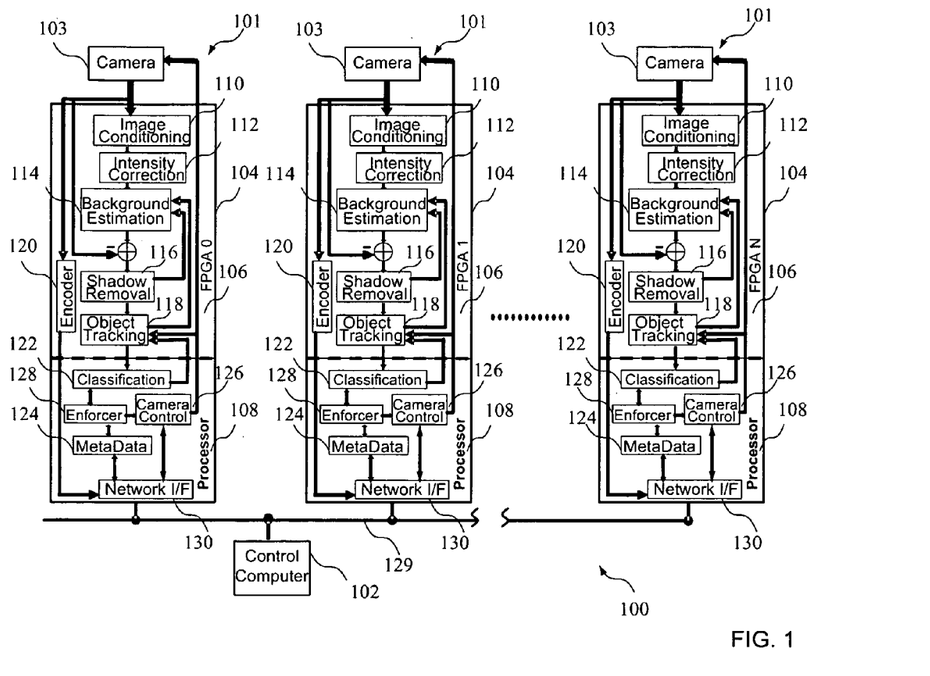
FIG. 1 is a block diagram of a surveillance system according to an embodiment of the present invention.

Turning first to FIG. 1, a block diagram of a surveillance system according to an embodiment the present invention is shown. As shown in FIG. 1, a surveillance system 100 comprises a plurality of similar camera systems 101 coupled to a control computer 102. Each camera system 101 comprises a camera 103 which is commonly available and may generate a video frame according to a predefined standard, such as a high definition television (HDTV) standard. The camera is coupled to a data processing block 104 of the camera system which may comprise an integrated circuit 106 having programmable logic and a processor 108. As will be described in more detail below, the processor may be incorporated in the integrated circuit having programmable logic.

An image conditioning block 110 interfaces with the camera to perform de-interlacing if necessary, up/down conversion of the input data rate if necessary, and global motion compensation for image stabilization and inter-frame alignment. Alternatively, the camera may provide the features of the image conditioning block. An intensity correction block 112 automatically adjusts to lighting changes caused by both the environment and the self-adjustments functions of the camera, and maintains a smooth intensity transition between frames. A background estimation block 114 determines the background in the presence of clutter and moving objects, and enables clean foreground segmentation in order to detect moving objects, as will be described in more detail below. The background estimation block 114 generates an estimate of the background as will be described in more detail below in reference to FIGS. 3-7. A shadow removal block 116 prevents shadows from being detected as foreground, while an object tracking block 118 allows the movement of detected objects to be tracked between frames. That is, an object may comprise a group of pixels that are grouped as an object in a previous frame and tracked from frame to frame. In order to generate the object tracking information, the background and any shadows related to the object are removed. An encoder 120 compresses the video stream before being sent to the network channel. The control computer may then use the object tracking information with a decompressed video signal to more easily identify objects of interest, with improved resolution, over a long span of time.

Low bandwidth classification information, such as the object tracking information, may be generated in the classification block 122 and stored along with metadata in a metadata buffer 124. The metadata may include, for example, the date the video was taken and details of the camera settings, such as lens, focal length, aperture, shutter timing, and white balance. The processor 108 may also provide camera control functions 126 in response to an enforcer 128. The enforcer acts as a virtual security guard, and uses results from classifications and input from the network to control the camera or adjust pertinent parameters. A network interface 130 provides the encoded video data, metadata and camera control information to the network communication link 129. The control computer 102 is coupled to the network communication link 129 to receive data from a network interface 130 for each of the camera systems 101. The control computer could be any type of general purpose computer or server having a monitor for displaying an image for one or more of the camera systems. The communication link 129 may be a part of any type of wired or wireless communication network, such as a telecommunication network, or data network, such as a local area network (LAN) or a wide area network (WAN). The low bandwidth functions may be relegated to a processor external to the integrated circuit, which may be for example an integrated circuit having programmable logic, or an embedded processor core of an integrated circuit having programmable logic, such as an FPGA having an embedded processor core. While the data processing block 104 is shown separate from the camera, any part or the entire data processing block may be incorporated in the camera. Similarly, while the control computer 102 is shown separate from the camera systems, the control computer may be incorporated in one or more of the camera systems.

By employing the data processing block 104 with the camera systems of the surveillance system, a low cost surveillance system is implemented. However, in order to provide beneficial object tracking information, intensity correction, background estimation and shadow removal must be performed. By implementing the high processing bandwidth functions such as intensity correction and background estimation for each camera, the processing intensive functions may be implemented remote from the control computer to provide object tracking, where compressed data representing the video frame and the object tracking information is provided to the control computer.

As will be described in more detail below, the circuits and methods of the present invention optimize background estimation to reduce the requirements of the data processing block 104 for processing the data and generate the object tracking information. In particular, the various embodiments set forth below reduce the storage requirements for storing data related to a background portion of a frame, and therefore the data transfer requirements for transferring data related to the background portion, such as updated parameters for background pixels stored in a memory. As will be described in more detail below, when processing high definition video images, the processing speed of the processor 108 may not enable any required updating of parameters associated with a background of a video frame. Whether a memory storing data related to the video frame is on the integrated circuit 106 or external to the integrated circuit 106, any reduction in the amount of data required to be stored will reduce the bandwidth of data which may need to be transferred to the memory and/or increase the resolution of the video data without increasing the bandwidth of data which must be transferred.

Figure 2:
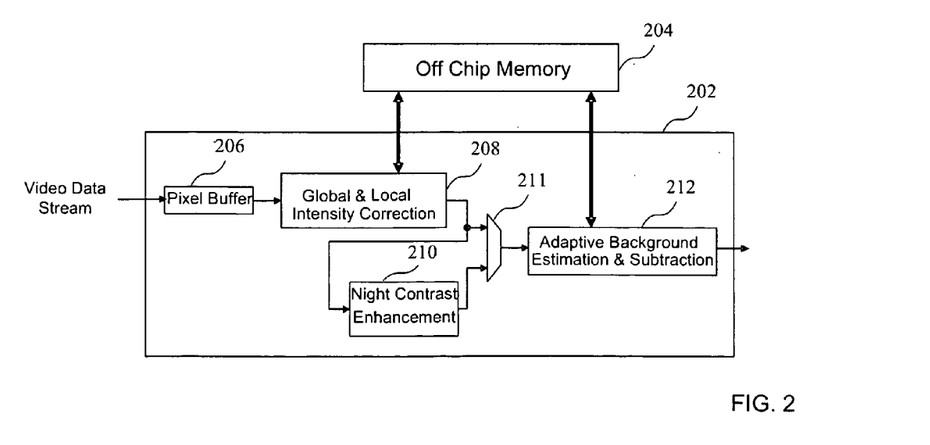
FIG. 2 is a block diagram of an integrated circuit coupled to a memory for receiving parameters for pixels of a video frame according to an embodiment of the present invention.

Turning now to FIG. 2, a block diagram of an integrated circuit 202 coupled to a memory for receiving parameters for pixels of a video frame according to an embodiment of the present invention is shown. The integrated circuit 202 comprises a hardware accelerator which provides both an intensity correction block and a background estimation and subtraction block. In particular, the integrated circuit 202 may be coupled to an off-chip memory 204 for storing the data generated by the integrated circuit 202. A pixel buffer 206 is coupled to receive the output of an image conditioning circuit, such as the image conditioning circuit 110. The output of the pixel buffer is coupled to a global and local intensity correction block 208. Either the output of the global and local intensity correction block 208 or data processed by a night contrast enhancement block 210 is selected by a multiplexer 211 and coupled to an adaptive background estimation block 212. The night contrast enhancement block 210 will be described in more detail below in reference to FIG. 8. As will be described in more detail below, the circuit of FIG. 2 performs video segmentation on HD sequences without the need to store frames, therefore providing an efficient circuit in terms of external memory bandwidth. The circuit is also small in terms of real-estate on the integrated circuit, and may be used broadly in the surveillance market.

Figure 3:
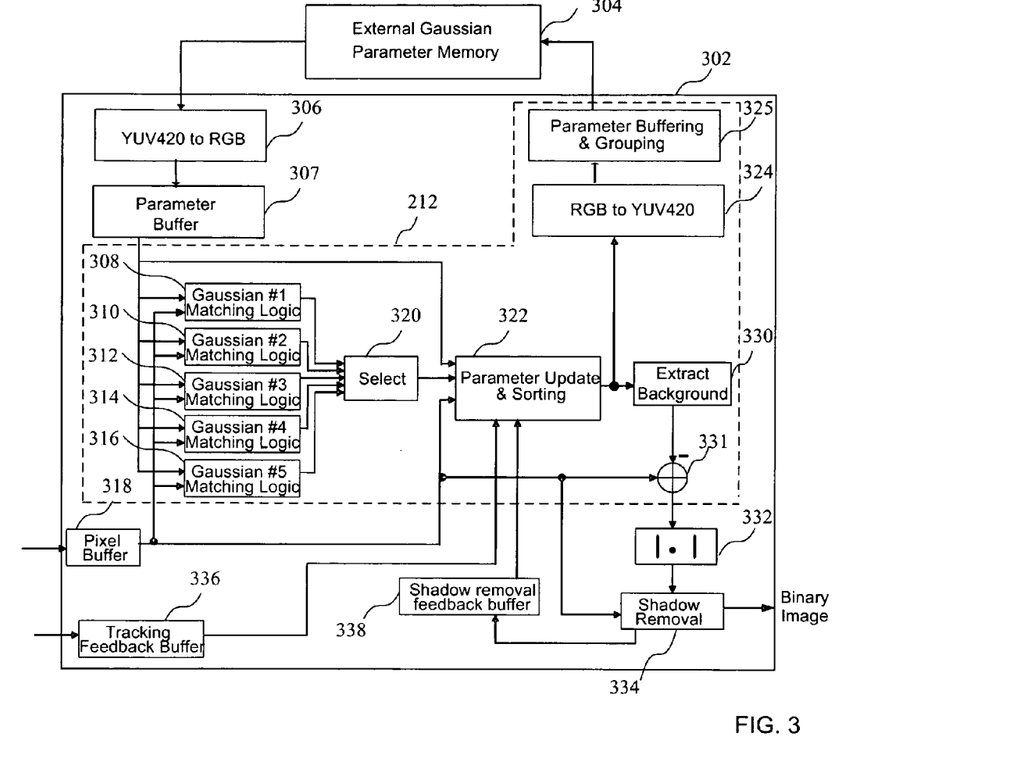
FIG. 3 is a an integrated circuit coupled to a memory for receiving parameters for pixels of a video frame according to an alternate embodiment of the present invention.

Turning now to FIG. 3, an integrated circuit coupled to a memory for receiving parameters for pixels of a video frame according to an alternate embodiment of the present invention is shown. The circuit of FIG. 3 shows a specific implementation of the adaptive background estimation block 212 using specific data formats representing the frames. Receptors in the human eye are only capable of detecting light having wavelengths from 400 nm to 700 nm. These receptors are called cones and are of three different types, including one for red light, one for green light and one for blue light. If a single wavelength of light is observed, the relative responses of these three receptors allow us to discern what we call the color of the light. This phenomenon is extremely useful because it enables generating a range of colors by simply adding together various proportions of light from just three different wavelengths. The process, known as additive color matching, is utilized in color television systems, where a resulting frame to be displayed is broken down into an array of picture elements or pixels to be displayed.

Generally, each pixel displays a proportion of red, green or blue color. The representation of an image in red, blue and green is commonly referred to as RBG. However, transmitting or storing these RBG color components requires significant bandwidth, and integrated circuits may have a more difficult time processing the data, such as the large volume of data in a high definition television (HDTV) image. Accordingly, luminance and color difference coding is often used to reduce the bandwidth of an image to be displayed. For example, the YUV format contains a Y portion representing a luminance component (also known as Luma) associated with brightness, and U and V portions representing chrominance components (also know as Chroma 1 and Chroma 2) associated with color. In addition to reducing bandwidth, the YUV format models human perception of color more closely than the standard RBG format. YUV420 means that for every four luma (Y) bytes there are two chroma bytes (alternating Cr and Cb). Even with the reduced bandwidth provided by the YUV format, the HDTV format has significant data requirements. An HDTV image may have 1920×1080 pixels and may use six times the bandwidth of traditional standard-definition TV. Accordingly, any reduction in the amount of data stored as a background image would be beneficial.

According to the circuit of FIG. 3, significant data storage requirements, and therefore data transfer requirements, may be achieved. Background estimation algorithms based on interframe difference are error prone when dealing with varying background scenes. Methods performing temporal median filtering of pixels require substantial frame buffering and do not handle multi-modal pixels well, thus making them unattractive to highly dynamic scenes. For example, for the n+1 frame, a model for a given pixel may be defined as $$B_{n+1} = \begin{cases} \alpha B_n(x) + (1-\alpha)I_n(x), & \text{if } x \text{ is non-moving} \\ B_n(x), & \text{if } x \text{ is moving} \end{cases} \quad (1)$$

where $B_0(x) = I_0(x)$. The threshold for each pixel is similarly updated using $$T_{n+1}(x) = \begin{cases} T_n(x), & \text{if } x \text{ is moving} \\ \alpha T_n(x) + 5(1-\alpha)|I_n(x) - B_n(x)|, & \text{if } x \text{ is non-moving} \end{cases} \quad (2)$$

where $\alpha$, in both Equation 1 and 2, is a constant that determines how fast the background information is updated.

For each new pixel, two immediate previous values must be evaluated in order to determine motion. Thus, the two previous frames must be stored into memory in addition to the estimated background value $B_n(x)$ of each pixel and the corresponding threshold $T_n(x)$. Equation 1 relies on the intensity $I_n(x)$ of the current pixel x in estimating the background. A problem arises when the pixel x is multi-modal, i.e. that it may have more than one representative value over time. This may result in a pixel being miss-classified as moving which in turn gives an incorrect update of the background. An example of a multi-modal pixel occurs when a scatter plot of the red and green color components of a single pixel is present over a period of time. That is, the same pixel has two representative modes that we desire to be classified as background. Methods of classifying a multimodal background pixel will be described in more detail below.

While adaptive background methods based on obtaining an online temporal mean of a pixel require less frame buffering, a pixel may have more than one mean over time in real scenes, where each mean is representative of the pixel's different background modes. Such a pixel is multi-modal and is not properly characterized as such when using a single statistical representation in an online averaging scheme. An adaptive method which uses a mixture of normal distributions to model a multi-modal background image sequence may be used. For each pixel, each normal distribution in its background mixture corresponds to the probability of observing a particular intensity or color in the pixel. This is consistent with scenes in which the background clutter is generated by more than one surface appearing in the pixel's view. Each surface is represented by a normal distribution having a mean equal to the surface intensity or color and a variance due to surface texture, illumination fluctuations or camera noise. A mixture of Gaussian (MoG) method using RGB color components is employed, and the Gaussian model parameters are updated without utilizing a large buffer of video frames.

In the Mixture of Gaussian method, a single pixel's distribution is modeled as a mixture of K Gaussians:

$$f(I_t) = \sum_{i=1}^{K} \omega_{i,t} \eta(I_t, \mu_{i,t}, \sigma_{i,t}) \quad (3)$$

where $\eta(I_t, \mu_{i,t}, \sigma_{i,t})$ is the i-th Gaussian component at time t with intensity mean $\mu_{i,t}$ and standard deviation $\sigma_{i,t}$. For each Gaussian, a weight factor, $\omega_{i,t}$ represents the portion of the data accounted for by the i-th component. Typically, K ranges from three to five depending on available storage. By way of example in FIG. 3, K=5 Gaussians are used. For each input pixel $I_t$, the first step is to identify the Gaussian whose mean is closest to $I_t$. The i-th Gaussian is declared a match if $\|I_t-\mu_{i,t-1}\| \leq D\sigma_{i,t-1}$ where D defines a small positive deviation threshold. The parameters of the matched Gaussian are updated as follows:

$$\omega_{i,t}=(1-\alpha)\omega_{i,t-1}+\alpha$$

$$\mu_{i,t}=(1-\rho)\mu_{i,t-1}+\rho I_t$$

$$\sigma^2_{i,t}=(1-\rho)\sigma^2_{i,t-1}+(x-\mu_{i,t})^2, \qquad (4)$$

where $\alpha$ is a user-defined learning rate with $0 \leq \alpha \leq 1$. A learning rate $\rho=\alpha/\omega i,t$ is defined for the parameters. If no matched Gaussian is found, the i-th Gaussian with the least weight is replaced by a new Gaussian with mean $I_t$, a large initial variance $\sigma_{i,t}$, and a small weight $\omega_{i,t}$. The rest of the Gaussians maintain the same means and variances and their weights are adjusted using the equation $$\omega_{i,t}=(1-\alpha)\omega_{i,t-1} \qquad (5)$$

Finally, all the weights are renormalized to sum up to one. To determine whether $I_t$ is a background pixel, all Gaussians are ranked by their values of $\omega_{i,t}/\sigma_{i,t}$. Higher-rank Gaussians thus have low variances and high probabilities, which are typical characteristics of background. If $i_1, \ldots i_K$ the Gaussian order after sorting, the first M Gaussians that satisfy the following criterion are declared to be the background components:

$$\sum_{k=i_1}^{i_M} \omega_{k,t} \geq \Gamma, \qquad (6)$$

where $\Gamma$ is the weight threshold that usually represents the percentage of time that the background is visible. $I_t$ is declared as a background pixel if $I_t$ is within D times the standard deviation from the mean of any one of the background Gaussians. It should be noted that the above formulation can be easily extended to handle color data. The computational complexity and storage requirement of MoG is linear in terms of number of Gaussians K. The proper initialization of the MoG is sometimes critical in achieving faster convergence speed. Faster convergence is also often achieved if one of the K Gaussians has its mean initialized to the current pixel value. The other K−1 Gaussian means are initialized to different values and are such that all K Gaussian means are equidistant. The weight and variances are all initialized to 0 and 1, respectively.

Unlike conventional devices which require extensive amount of external memory in order to store the parameters describing all K Gaussians of each pixel, the circuit of FIG. 3 significantly reduces the memory requirements for storing the parameters. Namely, for each pixel $$I_t, \text{ all } i = 1 \ldots K \text{ values of } \begin{pmatrix} \mu_{i,t-1} \\ \sigma_{i,t-1} \\ \omega_{i,t-1} \end{pmatrix}$$

vector representing each Gaussian must be retrieved from external memory prior to determining if $I_t$ is a background pixel. Choosing K=5, requires the equivalent of 15 frames to be stored externally. While some devices may be capable of handling the required external memory transaction bandwidths, the cost may prove to be too prohibitive for a large portion of the surveillance market. Further, for some lower cost devices, it may be difficult to attain the clock frequencies required to handle the bandwidths to process high rate sequences. As will be described in more detail below, the circuit of FIG. 3 combines, for a given pixel, the Gaussians determined to be similar, and groups neighboring pixels with similar Gaussian parameters and encode them together prior to saving them into memory, leading to significant bandwidth reduction.

As shown in FIG. 3, an integrated circuit 302 may be coupled to an external parameter memory 304 which stores data associated with the video frame. A Gaussian Parameter memory 304 is coupled to a YUV420-to-RGB converter circuit 306, which generates data to be stored in a parameter buffer 307. The output of the parameter buffer 307 comprises five mixture of Gaussian values which are coupled to five Gaussian Matching Logic circuits 308-316. Video data from a camera received at an input pixel buffer 318 is also coupled to each of the matching circuits. The input pixel buffer may be a FIFO containing the RGB components of the pixels in queue for processing. According to one embodiment, the matching logic compares the current pixel, $I_t$, with the mean of each Gaussian and then determines which Gaussian is a match. A select circuit 320 is coupled to the outputs of each of the matching circuits and determines which is the closest match to the input data. By way of example, these two steps may be implemented according to the Equations:

$$\text{dist}_{k,t}=(I_{R,t}-\mu_{R,k,t-1})^2+(I_{G,t}-\mu_{G,k,t-1})^2+(I_{B,t}-\mu_{B,k,t-1})^2 \qquad (7)$$

$$\text{match}_t=\{\text{dist}_{k,t} \leq D\sigma_{k,t} \leq D\sigma_{k,t-1}, \forall k=0, \ldots, K\} \qquad (8)$$

The parameter update and sorting block 322 updates the matching and non matching Gaussians, as will be described in more detail below. As will also be described in more detail below in reference to FIGS. 4-10, data converted from RGB to YUV420 by a RGB-to-YUV420 converter 324 will be buffered and grouped in a parameter buffering and grouping circuit 325. The background is then extracted from the previous frame by an extract background block 330, and subtracted from the current frame received from the pixel buffer 318 by a subtraction circuit 331. An absolute value of the result of the subtraction is generated by an absolute value circuit 332. After any shadows are removed by shadow removal circuit 334, a binary image related to the object being tracked is generated. Pixels determined to have been incorrectly classified as background based upon data from either a tracking feedback buffer 336 or shadow removal feedback buffer 338 have their Gaussians parameters updated such that only the parameters of the sorted Gaussians with the largest $\omega_{i,t}/\sigma_{i,t}$ value is updated using Equation 4. The mean and variance of the other Gaussians are unchanged while their weights are updated using Equation 4. The parameters of the current pixel are then sorted in descending order according to their value of $\omega_{i,t}/\sigma_{i,t}$, where i=1 ... K . Higher-rank Gaussians thus have low variances and high probabilities, which are typical characteristics of background. The Extract Background block of FIG. 3 produces the estimated background value of a pixel $I_t$. As seen in FIG. 3 and explained above, upon the update of the Gaussian parameters, all the weights are renormalized to sum up to one.

With the list of Gaussians sorted in descending order, we select only the first M Gaussians that satisfy Equation 6. The weights of the Gaussians satisfying Equation 6 are then used to produce the value of the background pixel, $B_t$, using the weighted sum:

$$B_t = \frac{\sum_{i=1}^{M \leq K} \omega_{i,t-1} \mu_{i,t-1}}{\sum_{i=1}^{M \leq K} \omega_{i,t-1}} \quad (9)$$

The shadow removal block 334 of FIG. 3 is used to determine if the result of Equation 9 is actually an undesired shadow pixel. Shadows are caused by the occlusion of a light source by some object in or outside the scene. The MoG method is not capable of detecting shadows from moving sources occluding light. Accordingly, a pixel obtained from background subtraction must be evaluated against the original frame to determine if it is actually a shadow.

In order to determine if a shadow pixel has not been correctly classified as background, background subtraction must be performed prior to the shadow removal block 334 of FIG. 3 by taking the absolute difference between the background estimate, $B_t$, from the current pixel $I_t$. The result is a three dimensional difference value, $\overline{F}_t$, which is then converted to a single dimensional intensity value using:

$$Frgd_t = 0.2125 \overline{F}_{R,t} + 0.7154 \overline{F}_{G,t} + 0.7154 \overline{F}_{B,t} \quad (10)$$

A threshold in then applied to the new foreground pixel, $Frgd_t$, such that a binary pixel results. This is performed using:

$$Fbin_t = \begin{cases} 1 & \text{if } Frgd_t > Thrsh \\ 0 & \text{otherwise} \end{cases} \quad (11)$$

A binary motion mask is produced from the set of binary pixels $Fbin_t$.

The binary motion mask does not imply the usage of memory storage, but is used here for illustration purposes because the actual shadow removal operation is performed pixel-wise. The motion mask is used here to identify the foreground pixels of the current frame. Given a binary motion mask pixel $Fbin_t$, with a logical 1 value, the pixel location at $Fbin_t$ is determined to be a shadow pixel if the flowing conditions are all satisfied:

$$|I_h - B_h| < Thrsh_h$$

$$|I_s - B_s| < Thrsh_s$$

$$Thrsk_{v1} < I_v / B_v < Thrsk_{v2} \quad (12)$$

where, $(I_h, I_s, I_v)$ and $(B_h, B_s, B_v)$ are the HSV equivalents of the RGB values of $I_t$ and $B_t$ respectively. The threshold values of Equation 12 are constants. If all the conditions of Equation 12 are true at pixel location $Fbin_t$, then the motion mask pixel at $Fbin_t$ is removed by setting it to logical 0.

Figure 4:
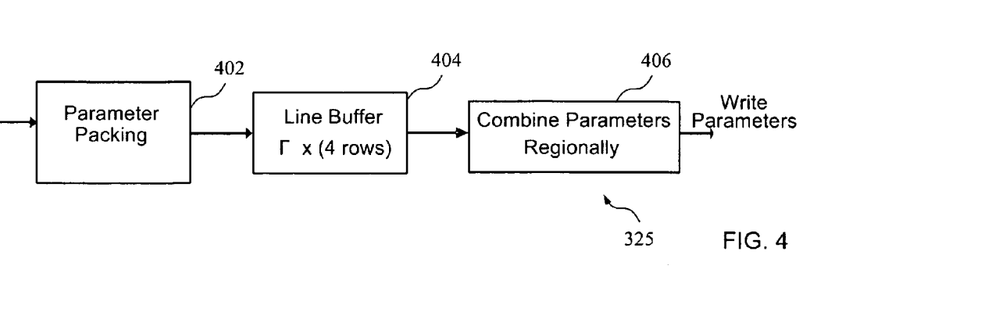
FIG. 4 is a circuit for implementing parameter buffering and grouping according to an embodiment of the present invention.

Turning now to FIG. 4, a circuit for implementing parameter buffering and grouping according to an embodiment of the present invention is shown. In particular, a parameter packing block 402 receives the YUV values, converted from the selected RGB values, and packs them according to some arrangement of pixels which is coupled to a line buffer 404. According to one embodiment where a 4×4 sub-matrix represents 16 pixels described in more detail below, the line buffer only needs to have 4 rows, each having data for four pixels to process the necessary data for evaluating a sub-matrix of pixels. As further described in reference to FIGS. 5-7, a block 406 will enable combining parameters regionally to reduce the amount of data required to be stored in the external parameter memory, and therefore the amount of data that must be sent to the memory.

Figure 5:
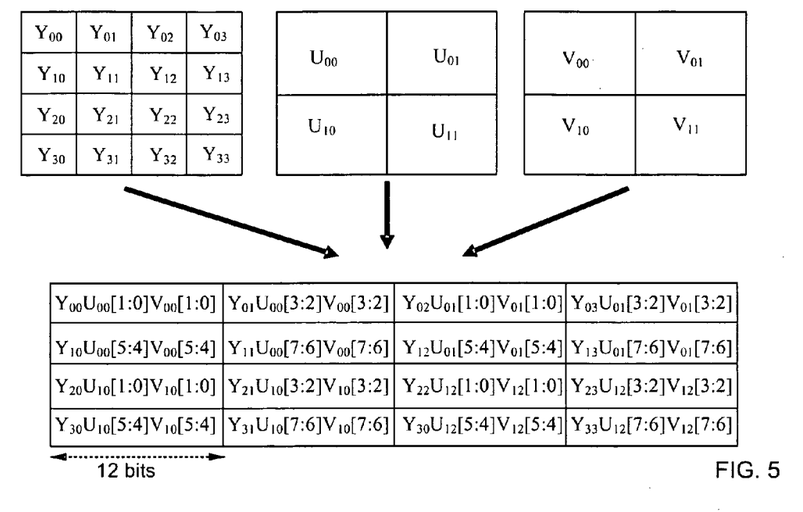
FIG. 5 is a block diagram showing a method of generating a matrix for updating parameters associated with a video frame according to an embodiment of the present invention.
Figure 6:
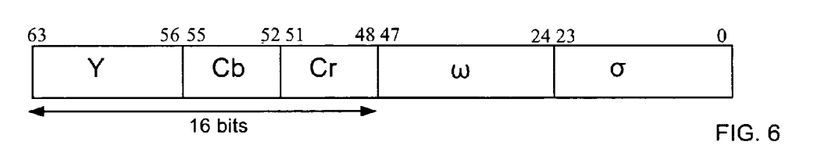
FIG. 6 is a data structure having data associated with a pixel of a video frame according to an embodiment of the present invention.

The RGB to YUV420 converter and parameter grouping and buffering block of FIG. 3 reduces the amount of information written into memory. Given an 8-bit representation of RGB components, at least 24-bits would be required to store the mean of each Gaussian. On the other hand, the average number of bits per pixel using YUV420 data is 12. For each pixel, 5 Gaussians must be written or read from memory. This requirement is significant because the amount of memory transactions may impede a real-time realization of the circuit, particularly for HD sequences. After the RGB-to-YUV converter converts and resamples the RGB mean value, $\mu_{i,t}$, of each of the $\Gamma$ Gaussians into a YUV420 value, the bits are efficiently packed to enable grouping, and therefore reduce the required memory. An efficient bit-packing in YUV space is adopted which uses 8-bits for the Luminance value, while the half-sampled U and V components each have their 8-bit representation dissected into four 2-bit values. These dissected 2-bits are then each appended to one of four defined 8-bit Luminance values within neighboring 2×2 blocks. This procedure is shown in FIG. 5 where the Y, U and V planes are merged into a single 12-bit plane. This compacting of the Gaussian parameters reduces memory page breaks and improves memory bandwidth, and leaves room to pack the Gaussians' weights and variances, $\omega$ and $\alpha$, into a 32-bit format as shown in FIG. 6.

To store the five Gaussians of each pixel in a 1080p sequence, a Line Buffer of 4 rows is used to buffer four lines of $\Gamma$=5 Gaussian parameters $(\mu_{i,t}, \omega_{i,t}, \sigma_{i,t})$, where each row may store Gaussian parameters for 4 pixels, creating a 4×4 matrix representing 16 pixels. The reason for this buffering is to assemble neighboring pixels and their respective $\Gamma$ Gaussian parameters. The combine parameters regionally block 406 will then spatially combine these pixels so that less writes to external memory are performed. In the combine parameters regionally block 406 of FIG. 4, the pixels mean $$\mu_{i,t} = \begin{pmatrix} Y_{i,t} \\ U_{i,t} \\ V_{i,t} \end{pmatrix},$$

weight $\omega_{i,t}$ and variance $\sigma_{i,t}$ for each of their $\Gamma$ Gaussians are examined for similarity within regions. This is done in a three step process. The 4 rows from the line buffering block is spatially divided into 4×4 blocks for each of the $\Gamma$ Gaussians. Within a 4×4 block, the similarity of the pixels is evaluated based on the histograms of the $\omega_{i,t}/\sigma_{i,t}$ ratios and luminance $Y_{i,t}$ of the Gaussian means. Pixels within a 4×4 block are deemed similar if the following two conditions are valid:

$$\underset{i \in 4 \times 4}{\operatorname{argmax}} \left[ hist(\omega_{i,t}/\sigma_{i,t}) \right] \geq Thrsh1 \quad (13)$$

$$\underset{Y_{i,t}}{\operatorname{argmax}} \left[ \underset{i \in 4 \times 4}{hist}(Y_{i,t}) \right] \geq Thrsh2 \quad (14)$$

where Thrsh1 and Thrsh2 are constant threshold values used to determined if sufficient amount of pixels within the 4×4 population are similar. The histograms are computed over equidistant bins. If the conditions of Equations 13 and 14 are not simultaneously met, then the current 4×4 block does not have a homogenous population and the parameters of each pixel must all be written individually into memory.

Figure 7:
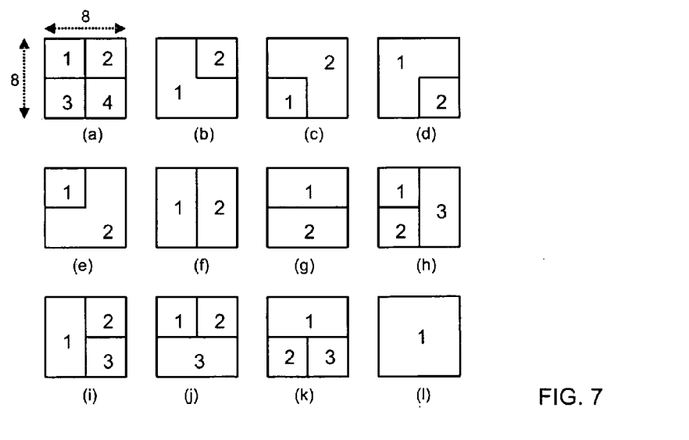
FIG. 7 is a series of diagrams showing sub-matrices of a matrix having data for pixels of a video frame according to an embodiment of the present invention.

If Equations 3 and 4 are both satisfied for a 4×4 block, then the pixels are examined for a potential grouping with other 4×4 blocks within the current line buffer and with the next 4 rows. Eleven types of grouping morphologies are examined and the goal is to determine the best grouping containing the most number of similar pixels. The grouping morphologies are shown in FIG. 7, where an 8×8 block is regionalized into 1 to 4 regions. The morphology with the smallest number of regions and containing the most number of similar pixels is selected, where Equations 13 and 14 are used to determine similarity within regions. The Gaussian parameters within each region of the winning morphological grouping are replaced by the median value $Y_{i,t}$ of the region and the corresponding $\omega_{i,t}$ and $\sigma_{i,t}$ parameters. For regions where Equations 13 and 14 are not satisfied, groupings as shown in FIG. 7 may still be performed on the grayscale $Y_{i,t}$ intensity values provided that enough samples of $Y_{i,t}$, inside the region under evaluation, are similar. This method also applies to groupings of weights and variances. Accordingly, only one intensity value, weight or variance may need to be provided to the memory for a group of pixels. Combining the Gaussian parameters saves memory bandwidth by reducing the amount of parameter data that needs to be stored in external memory. If a certain 4×4 block or groups of 4×4 blocks are determined to have the same parameters, the blocks or groups of blocks are recorded so that only a single set of parameters needs to be stored, and a single set of parameters need to be read from the memory. For example, a lookup table may be maintained indicating which blocks or groups of blocks have the same parameters stored at a location in the memory. Accordingly, when reading the data for all of the pixels of the block, only a single value will be read from the location in the memory. In a worst case scenario, 64 sets of parameters, one for each of the 64 pixels in the 8×8 matrix, will be stored. However, by way of example, only 3 sets of parameters will need to be stored in the configuration of FIG. 7($k$) and only one set of parameters will need to be stored in the configuration of FIG. 7($l$). Without this process, a 1080p@30 fps sequence would require 1080×1920(pixels)×5 (Gaussians)×64 (bits)×30 (frames/sec)≈20 Gbps of bandwidth for each read and write frame cycle. When combining the pixels as described, morphological groupings containing two regions are the winning structures on average. This means that in an 8×8 grouping, only two writes to memory are necessary. On average, the resulting bandwidth is now ⅟₃₂'th of the original bandwidth or 312.5 Mbps. In particular, using the circuits and methods of the present invention, a 1080p@30 fps sequence would require 1080×1920 (pixels)×5 (Gaussians)×64 (bits)×30 (frames/sec)/32≈625 Mbps of bandwidth for each read and write frame cycle. To keep track of the type of morphology used (or not) when reading back from external memory, an internal memory map is used. The memory maps keeps track of successful grouping of 4×4 and 8×8 blocks. This instructs the YUV to RGB 306 and Parameter Buffer Block 307 of FIG. 3 of the exact amount of reads necessary to retrieve the Gaussians from the previous frame.

Video surveillance algorithms may not perform well in low illumination environment, which is typically the case in the nighttime scenes. There are two main problems which limit the usage of the same daytime surveillance algorithms in nighttime scenes. First, the low illumination makes it difficult for conventional algorithms to accurately estimate the background from the scene images. Second, the color information should be kept such that the tracking algorithms are still able to differentiate between the different moving objects.

The enhancement of nighttime video may be accomplished using a Low Dynamic Range (LDR) tone mapping technique according to the following mapping function:

$$y = 255 \frac{\log\left(\frac{x}{255}(\Psi - 1) + 1\right)}{\log(\Psi)} \quad (15)$$

where x is the pixel value of the original nighttime frame, y is the pixel value of the enhanced frame, $\psi$ is a parameter which controls the shape of the correction curve. Another method which may be used for contrast enhancement is the histogram equalization. Histogram equalization remaps the gray levels of the frame based on the probability distribution of the input gray levels. For an input frame with Y(i, j) gray scale values, a total number of pixels N and K gray levels, the histogram equalization technique requires a number of steps. The probability density function (PDF) of the input frame is determined according to the following equation:

$$P(k) = \frac{n_k}{N}; \text{ for } k = 0, 1, \ldots K\text{-}1. \quad (16)$$

The cumulative distribution function (CDF) of the input frame is then computed according to the following equation:

$$C(k) = \sum_{m=0}^{k} P(m), \text{ for } k = 0, 1, \ldots K\text{-}1 \quad (17)$$

The CDF values are then used to remap the gray levels of the input frame as follows:

$$y(i,j) = C(Y(i,j)), \text{ where} \quad (18)$$

$$Y(i,j) = y(i,j)*(\max(Y(i,j)) - \min(Y(i,j))) + \min(Y(i,j)) \quad (19)$$

According to one aspect of the present invention, a method for nighttime surveillance adapts the histogram equalization technique. A histogram equalization method may be modified to maintain the color information of the original nighttime frames. In addition, the CDF of the previous frame is used to enhance the current frame rather than the CDF of the current frame to avoid storing any frames. All of the histogram equalization steps described above are performed until a gray scale frame Y'(i, j) is reached. The contrast enhancement is then applied to the color frame by enhancing each of the three image components (RGB) separately. This is accomplished by multiplying each of the RGB values of each pixel by the ratio of its enhanced luminance to the original luminance as shown in the following equation:

$$S'_m(i, j) = S_m(i, j) \frac{Y'(i, j)}{Y(i, j)}, \quad (20)$$

where m=1, 2, and 3 for red, green, and blue components.

Figure 8:
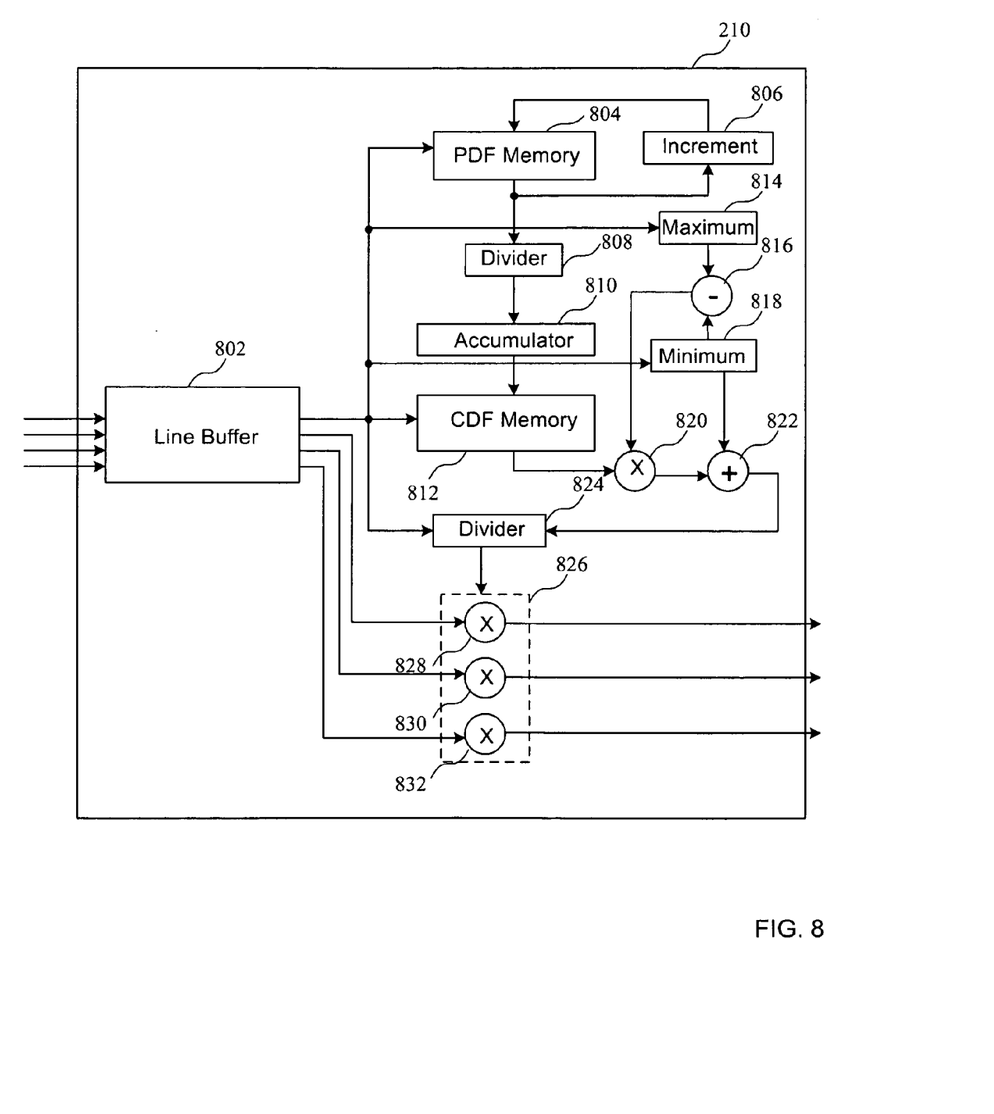
FIG. 8 is a block diagram of the nighttime contrast enhancement circuit according to an embodiment of the present invention.

Turning now to FIG. 8, a block diagram of the nighttime contrast enhancement circuit is shown. In particular, a line buffer 802 is coupled to receive input data for frames of data. A PDF memory 804 is coupled to receive the output of the line buffer, and an output of the PDF memory is incremented by an incrementor 806. The output of the PDF memory 804 is also coupled to a divider circuit 808 which provides a value to an accumulator 810. A CDF memory 812 receives the output of the line buffer and the output of the accumulator 810. Various calculations are performed as described above. A maximum value of the input data is determined by a maximum block 814 and coupled to a subtractor circuit 816, which also receives a minimum value determined by the minimum circuit 818. The result of the subtraction is coupled to a multiplier 820 which also receives the value stored in the CDF memory 812. The result of the multiplication is added to the minimum value in an adder 822, and the result is coupled to a divider 824. The output of the divider is coupled to a multiplication block 826 comprising multipliers 828-832.

The circuit of FIG. 8 enables nighttime surveillance set forth above. The input to the architecture is an RGB image and luminance image in raster scan order. The histogram equalization is performed for the luminance image and applied to the RGB image. The architecture uses one line buffer to buffer 256 input pixels, where 256 cycles are required to evaluate the CDF from the PDF of the previous frame. The PDF of the previous frame is used instead of the current frame's PDF to avoid storing any frame. Because the architecture has two local memories to store the 256 PDF values and 256 CDF values, no external memory storage is required for the architecture. The architecture performs two tasks for each new frame including enhancing the current frame using the PDF and CDF of the previous frame, and building the histogram PDF for the 256 gray levels in the current luminance frame.

The architecture operation may include the following steps. In an initialization step, the histogram PDF for the 256 gray levels in the luminance frame is built. The minimum and maximum values of the luminance frame are then computed. For each new frame, the following steps are also performed. The CDF of the previous frame is computed according to Equation 17 using the stored PDF. The CDF values are used to remap the gray levels of the current frame according to Equations 18 and 19, using the stored minimum and maximum luminance values of the previous frame. Finally, the remapped gray levels and the current gray levels are used to enhance the current frame's RGB values according to Equation 20.

Figure 9:
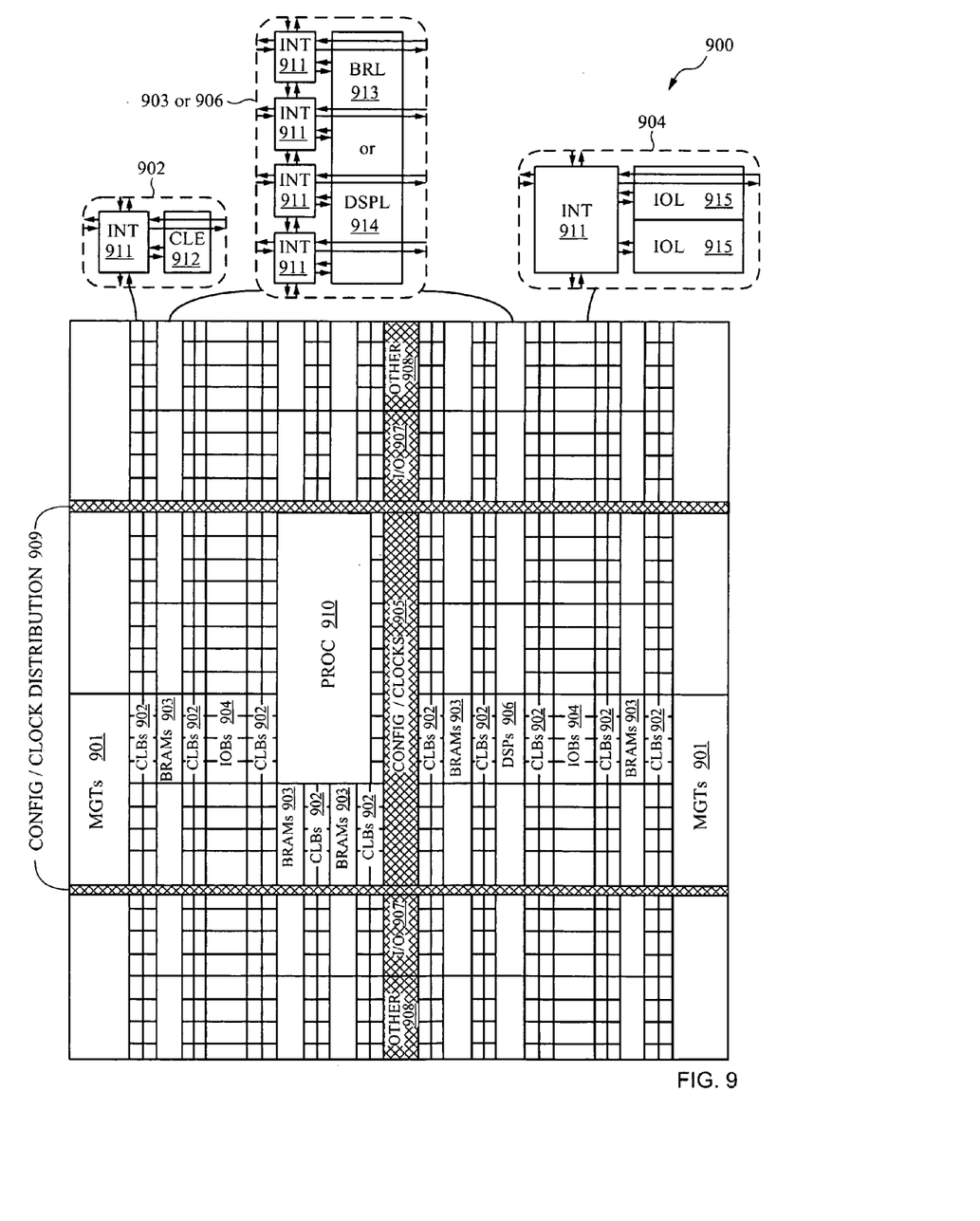
FIG. 9 is a block diagram of a programmable logic device for implementing the circuits of FIGS. 1-8 according to an embodiment of the present invention.

Turning now to FIG. 9, a block diagram of a programmable logic device for implementing the circuits of FIGS. 1-8 according to an embodiment of the present invention is shown. The device of FIG. 9 comprises an FPGA architecture 900 having a large number of different programmable tiles including multi-gigabit transceivers (MGTs 901), configurable logic blocks (CLBs 902), random access memory blocks (BRAMs 903), input/output blocks (IOBs 904), configuration and clocking logic (CONFIG/CLOCKS 905), digital signal processing blocks (DSPs 906), specialized input/output blocks (I/O 907) (e.g., configuration ports and clock ports), and other programmable logic 908 such as digital clock managers, analog-to-digital converters, system monitoring logic, and so forth. Some FPGAs also include dedicated processor blocks (PROC 910).

In some FPGAs, each programmable tile includes a programmable interconnect element (INT 911) having standardized connections to and from a corresponding interconnect element in each adjacent tile. Therefore, the programmable interconnect elements taken together implement the programmable interconnect structure for the illustrated FPGA. The programmable interconnect element (INT 911) also includes the connections to and from the programmable logic element within the same tile, as shown by the examples included at the top of FIG. 9.

For example, a CLB 902 may include a configurable logic element (CLE 912) that may be programmed to implement user logic plus a single programmable interconnect element (INT 911). A BRAM 903 may include a BRAM logic element (BRL 913) in addition to one or more programmable interconnect elements. The BRAM comprises dedicated memory separate from the distributed RAM of a configuration logic block. Typically, the number of interconnect elements included in a tile depends on the height of the tile. In the pictured embodiment, a BRAM tile has the same height as four CLBs, but other numbers (e.g., five) may also be used. A DSP tile 906 may include a DSP logic element (DSPL 914) in addition to an appropriate number of programmable interconnect elements. An IOB 904 may include, for example, two instances of an input/output logic element (IOL 915) in addition to one instance of the programmable interconnect element (INT 911). The location of connections of the device is controlled by configuration data bits of a configuration bitstream provided to the device for that purpose. As will be described in more detail below, the programmable interconnects, in response to bits of a configuration bitstream, enable connections comprising interconnect lines to be used to couple the various signals to the circuits implemented in programmable logic, or other circuits such as BRAMs or the processor.

In the pictured embodiment, a columnar area near the center of the die (shown shaded in FIG. 9) is used for configuration, clock, and other control logic. Horizontal areas 909 extending from this column are used to distribute the clocks and configuration signals across the breadth of the FPGA. Some FPGAs utilizing the architecture illustrated in FIG. 9 include additional logic blocks that disrupt the regular columnar structure making up a large part of the FPGA. The additional logic blocks may be programmable blocks and/or dedicated logic. For example, the processor block PROC 910 shown in FIG. 9 spans several columns of CLBs and BRAMs.

Note that FIG. 9 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 9 are purely exemplary. For example, in an actual FPGA more than one adjacent column of CLBs is typically included wherever the CLBs appear, to facilitate the efficient implementation of user logic. The circuits and methods of the present invention may be implemented in the PLD of FIG. 9, or in any other suitable device, including any type of integrated circuit having programmable logic. In fact, the application area that maximizes the usage of FPGAs is in video analytics performed at the camera level. FIG. 1 shows an example of a linked camera system containing FPGAs that are networked together. The FPGAs perform the video analytics and are capable of controlling their respective camera. FPGAs are perfectly suited to tackle the challenges posed from the increase in bandwidth required to support the data rates for video surveillance, including the generation of video images at high definition (HD) rates.

Figure 10:
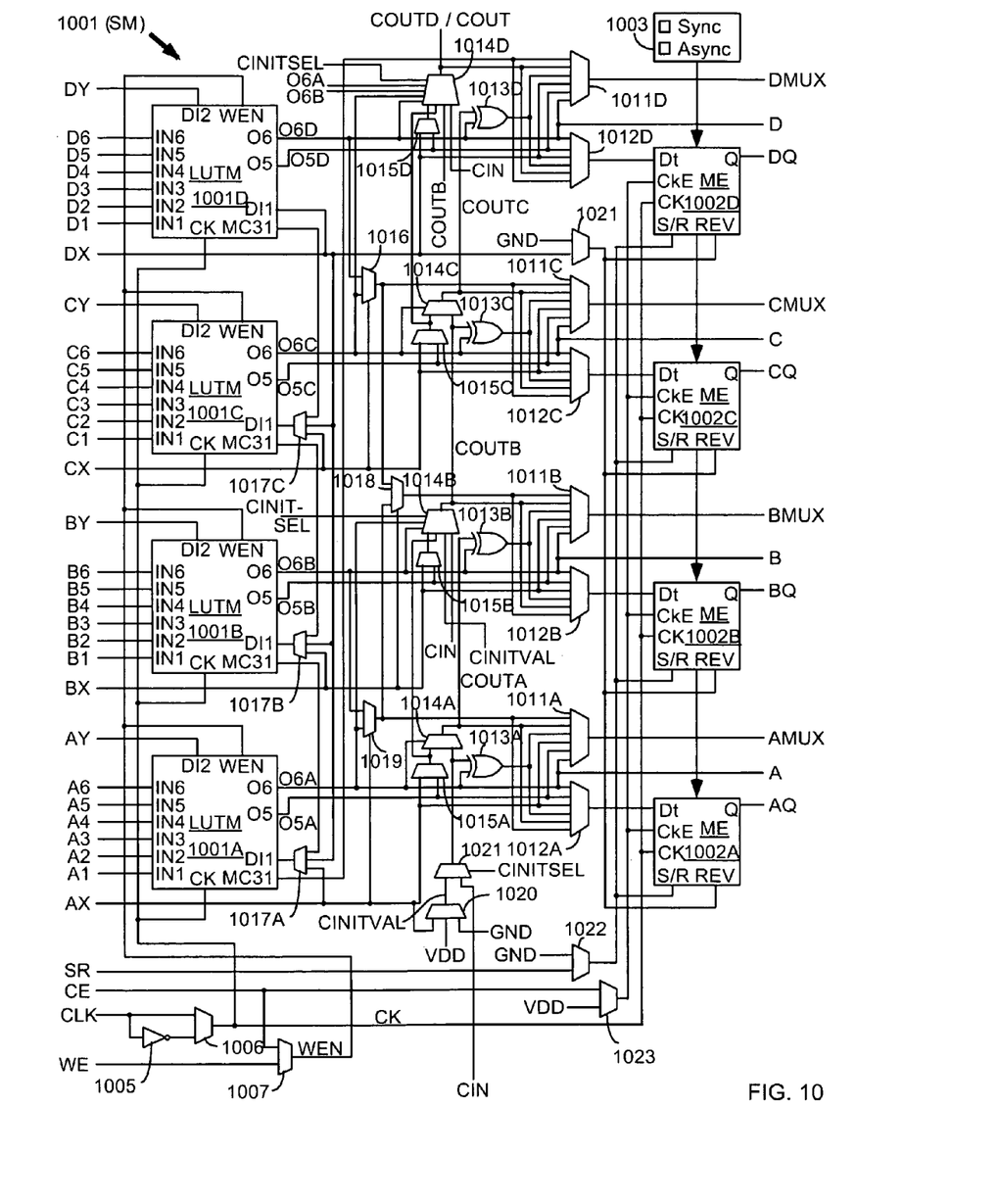
FIG. 10 is a block diagram of a configurable logic element of the circuit of FIG. 9 according to an embodiment of the present invention.

Turning now to FIG. 10, a block diagram of a configurable logic element of the device of FIG. 9 according to an embodiment of the present invention is shown. In particular, FIG. 10 illustrates in simplified form a configurable logic element of a configuration logic block 902 of FIG. 9. In the embodiment of FIG. 10, slice M 1001 includes four lookup tables (LUTMs) 1001A-1001D, each driven by six LUT data input terminals A1-A6, B1-B6, C1-C6, and D1-D6 and each providing two LUT output signals O5 and O6. The O6 output terminals from LUTs 1001A-1001D drive slice output terminals A-D, respectively. The LUT data input signals are supplied by the FPGA interconnect structure via input multiplexers, and the LUT output signals are also supplied to the interconnect structure. Slice M also includes: output select multiplexers 1011A-1011D driving output terminals AMUX-DMUX; multiplexers 1012A-1012D driving the data input terminals of memory elements 1002A-1002D; combinational multiplexers 1016, 1018, and 1019; bounce multiplexer circuits 1022-1023; a circuit represented by inverter 1005 and multiplexer 1006 (which together provide an optional inversion on the input clock path); and carry logic comprising multiplexers 1014A-1014D, 1015A-1015D, 1020-1021 and exclusive OR gates 1013A-1013D. All of these elements are coupled together as shown in FIG. 10. Where select inputs are not shown for the multiplexers illustrated in FIG. 10, the select inputs are controlled by configuration memory cells. That is, configuration bits of the configuration bitstream stored in configuration memory cells are coupled to the select inputs of the multiplexers to select the correct inputs to the multiplexers. These configuration memory cells, which are well known, are omitted from FIG. 10 for clarity, as well as from other selected figures herein.

In the pictured embodiment, each memory element 1002A-1002D may be programmed to function as a synchronous or asynchronous flip-flop or latch. The selection between synchronous and asynchronous functionality is made for all four memory elements in a slice by programming Sync/Asynch selection circuit 1003. When a memory element is programmed so that the S/R (set/reset) input signal provides a set function, the REV input terminal provides the reset function. When the memory element is programmed so that the S/R input signal provides a reset function, the REV input terminal provides the set function. Memory elements 1002A-1002D are clocked by a clock signal CK, which may be provided by a global clock network or by the interconnect structure, for example. Such programmable memory elements are well known in the art of FPGA design. Each memory element 1002A-1002D provides a registered output signal AQ-DQ to the interconnect structure. Because each LUT 1001A-1001D provides two output signals, O5 and O6, the LUT may be configured to function as two 5-input LUTs with five shared input signals (IN1-IN5), or as one 6-input LUT having input signals IN1-IN6.

In the embodiment of FIG. 10, each LUTM 1001A-1001D may function in any of several modes. When in lookup table mode, each LUT has six data input signals IN1-IN6 that are supplied by the FPGA interconnect structure via input multiplexers. One of 64 data values is programmably selected from configuration memory cells based on the values of signals IN1-IN6. When in RAM mode, each LUT functions as a single 64-bit RAM or two 32-bit RAMs with shared addressing. The RAM write data is supplied to the 64-bit RAM via input terminal DI1 (via multiplexers 1017A-1017C for LUTs 1001A-1001C), or to the two 32-bit RAMs via input terminals DI1 and DI2. RAM write operations in the LUT RAMs are controlled by clock signal CK from multiplexer 1006 and by write enable signal WEN from multiplexer 1007, which may selectively pass either the clock enable signal CE or the write enable signal WE. In shift register mode, each LUT functions as two 16-bit shift registers, or with the two 16-bit shift registers coupled in series to create a single 32-bit shift register. The shift-in signals are provided via one or both of input terminals DI1 and DI2. The 16-bit and 32-bit shift out signals may be provided through the LUT output terminals, and the 32-bit shift out signal may also be provided more directly via LUT output terminal MC31. The 32-bit shift out signal MC31 of LUT 1001A may also be provided to the general interconnect structure for shift register chaining, via output select multiplexer 1011D and CLE output terminal DMUX. The devices having programmable logic and methods of the present invention may be implemented according to the device of FIGS. 9 and 10, or in any device, including any type of integrated circuit having programmable logic.

Figure 11:
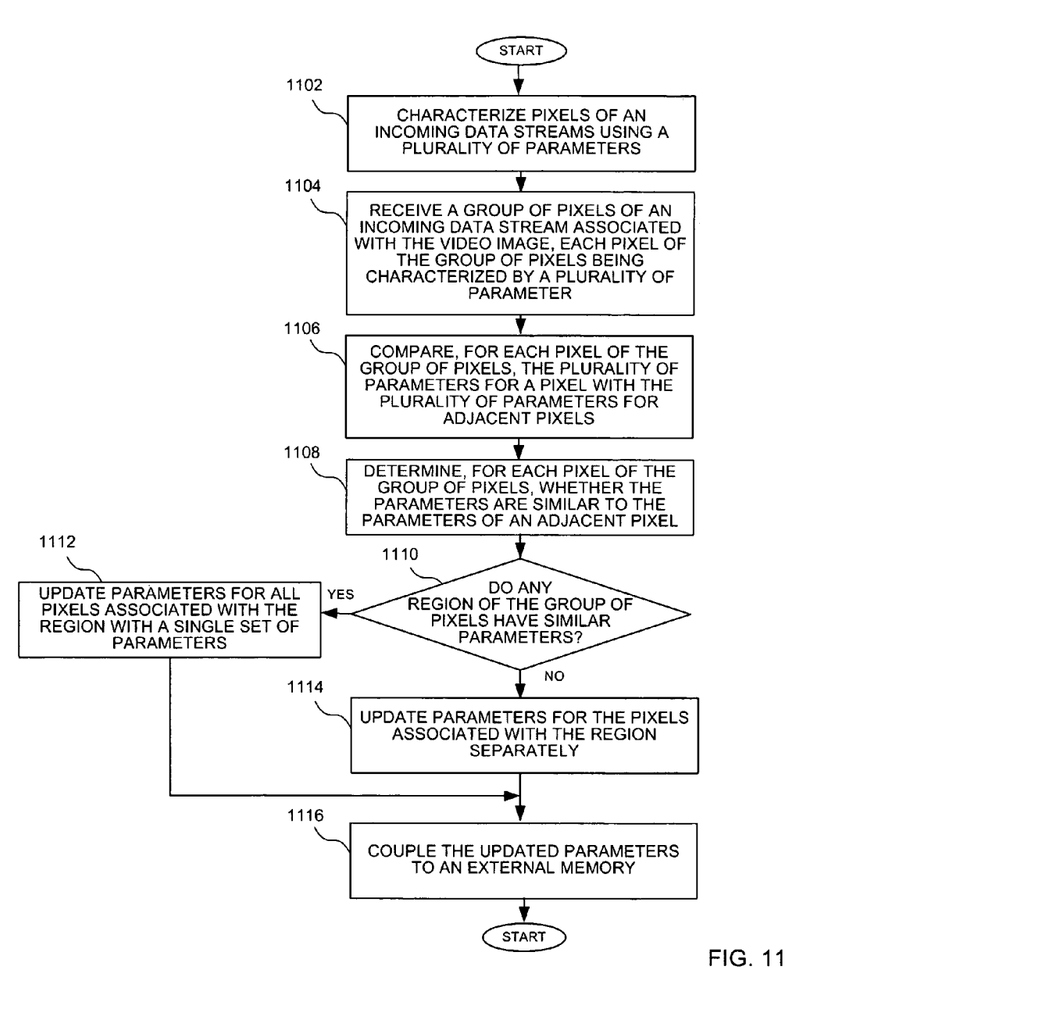
FIG. 11 is a flow chart showing a method of updating parameters for pixels associated with a background portion of a video frame according to an embodiment of the present invention.

Referring to FIG. 11, a flow chart shows a method of updating parameters for pixels associated with a background portion of a video frame according to an embodiment of the present invention. In particular, pixels of an incoming data streams are characterized using a plurality of parameters at a step 1102. A group of pixels of an incoming data stream associated with the video image are received, where each pixel of the group of pixels being characterized by a plurality of parameters at a step 1104. For each pixel of the group of pixels, the plurality of parameters for a pixel is compared with the plurality of parameters for adjacent pixels at a step 1106. For each pixel of the group of pixels, it is determined whether the parameters are similar to the parameters of an adjacent pixel at a step 1108. It is then determined whether any region of the group of pixels have similar parameters at a step 1110. Parameters for all pixels associated with the region are updated with a single set of parameters at a step 1112. Otherwise, parameters for the pixels associated with the region are updated separately at a step 1114. The updated parameters are then coupled to an external memory at a step 1116. The method of FIG. 11 may be employed using any of the circuits of FIGS. 1-10 as described above, or other suitable circuits.

It can therefore be appreciated that the new and novel integrated circuit and method of updating parameters for pixels associated with a background estimation portion of a video frame has been described. It will be appreciated by those skilled in the art that numerous alternatives and equivalents will be seen to exist which incorporate the disclosed invention. As a result, the invention is not to be limited by the foregoing embodiments, but only by the following claims.

I claim:

1. A method of updating parameters for pixels associated with a background estimation portion of a video frame, the method comprising:
   receiving pixels of an incoming data stream associated with the video frame;
   characterizing each pixel of a matrix of pixels of the video frame based upon parameters comprising a luminance value, chrominance values, a weight value and a variance for the pixel;
   storing the characterizations of the pixels of the matrix of pixels in a memory;
   comparing, for each pixel of the matrix of pixels, the parameters for the pixel with the parameters for adjacent pixels of the matrix;
   determining, for each pixel of the matrix of pixels, whether the parameters are similar to the parameters for the adjacent pixels;
   identifying one or more regions of the matrix of pixels having similar parameters;
   updating parameters, for each region of the one or more regions, with a single set of parameters; and
   storing the updated parameters for each region of the one or more regions.

2. The method of claim 1 wherein determining, for each pixel of the matrix of pixels, whether the plurality of parameters are similar to parameters for the adjacent pixels comprises comparing, for each pixel, the parameters for the pixel with the parameters for adjacent pixels.

3. The method of claim 1 wherein identifying one or more regions of the matrix of pixels having similar parameters comprises identifying sub-matrices of the matrix.

4. The method of claim 1 wherein updating parameters, for each region of the one or more regions, with a single set of parameters comprises coupling data to an external memory.

5. A method of updating parameters for pixels associated with a background estimation portion of a video frame, the method comprising:
- characterizing pixels of an incoming data stream using a parameters comprising, for each pixel, a luminance value, chrominance values, a weight value and a variance for the pixel;
- storing data for a group matrix of pixels of the incoming data stream associated with the video frame, each pixel of the group matrix of pixels being characterized by the parameters;
- establishing a plurality of sub-matrices of the matrix; comparing, for each pixel of a sub-matrix, the parameters for a pixel of the sub-matrix with the plurality of parameters for other pixels of the sub-matrix;
- determining whether the pixels of the sub-matrix have similar parameters;
- identifying sub-matrices of the matrix having similar parameters; and
- updating parameters for all pixels associated with each sub-matrix having similar parameters with a single set of parameters.

6. The method of claim 5 wherein characterizing pixels of an incoming data stream using parameters comprises selecting a Gaussian value of a mixture of Gaussian values.

7. The method of claim 5 wherein comparing, for each pixel of a sub-matrix, the parameters for the pixel of the sub-matrix with the plurality of parameters for another pixel comprises comparing the luminance value to a first threshold and a ratio of the weight value and the variance to a second threshold.

8. The method of claim 5 wherein identifying sub-matrices of the matrix having similar parameters comprises grouping sub-matrices.

9. The method of claim 5 further comprising receiving RGB data, wherein storing data for a matrix comprises establishing a matrix having YUV values based upon the RGB data.

10. An integrated circuit having a circuit for updating parameters for pixels associated with a background estimation portion of a video frame, the integrated circuit comprising:
- an input buffer for receiving pixels of data of a data stream comprising the video frame;
- a processing circuit coupled to the input buffer, the processing circuit characterizing each pixel by a luminance value, chrominance values, a weight value and a variance for the pixel;
- a plurality of sets of parameters provided at an output of the processing circuit, wherein a single set of parameters is provided for each region of the matrix having similar parameters based upon a comparison of the parameters of a pixel of a region with parameters of adjacent pixels of the region;
- a parameter memory coupled to receive, for each region of the one or more regions, the single set of parameters from the processing circuit.

11. The integrated circuit of claim 10 further comprising a circuit coupled to receive YUV data from the parameter memory and convert it to RGB data.

12. The integrated circuit of claim 11 wherein the processing circuit compares the pixel of data received at the input buffer with the data in the parameter buffer.

13. The integrated circuit of claim 10 further comprising a circuit coupled to receive RGB data and convert it to YUV data to be stored in the parameter memory.

14. The integrated circuit of claim 10 wherein the processing circuit is coupled to receive a plurality of Gaussian values of a mixture of Gaussian values and select a Gaussian value which is closest to a pixel of the received pixels of data.

15. The integrated circuit of claim 10 wherein the integrated circuit comprise a programmable logic device.

* * * * *